United States Patent [19]

Jones

[11] Patent Number: 4,738,789

[45] Date of Patent: Apr. 19, 1988

[54] SURFACTANT SOLVENT COMPOSITION

[76] Inventor: Loyd W. Jones, P.O. Box 9917, Tulsa, Okla. 74107

[21] Appl. No.: 808,219

[22] Filed: Dec. 12, 1985

Related U.S. Application Data

[63] Continuation of Ser. No. 505,790, Jun. 20, 1983, abandoned.

[51] Int. Cl.$^4$ .................. E21B 43/27; E21B 43/22
[52] U.S. Cl. .................. 252/8.553; 166/307; 252/8.552; 252/8.554
[58] Field of Search .................. 252/8.55 C, 8.55 D, 252/8.55 B, 8.553, 8.554, 8.552; 166/307

[56] References Cited

U.S. PATENT DOCUMENTS

| | | | |
|---|---|---|---|
| 2,356,205 | 8/1944 | Blair et al. | 252/8.55 |
| 2,677,700 | 5/1954 | Jackson | 252/356 X |
| 3,004,056 | 10/1961 | Nunn et al. | 252/351 X |
| 3,033,889 | 5/1962 | Chiddix et al. | 252/8.55 X |
| 3,083,158 | 3/1963 | Markham | 252/8.55 |
| 3,402,770 | 9/1968 | Messenger | 252/8.55 X |
| 3,819,520 | 6/1974 | Jones et al. | 252/8.55 |
| 4,113,631 | 9/1978 | Thompson | 252/8.55 |
| 4,293,428 | 10/1981 | Gale et al. | 252/8.55 |
| 4,406,799 | 9/1983 | Hunter | 252/8.55 |
| 4,448,697 | 3/1984 | McCoy et al. | 252/8.55 |
| 4,601,836 | 7/1986 | Jones | 166/307 X |

*Primary Examiner*—Herbert B. Guynn
*Attorney, Agent, or Firm*—Head & Johnson

[57] ABSTRACT

A micellar acidic surfactant solvent composition of enhanced oil/organic solvency and method of preparing and using same. The oil solvency of a propoxylated-/ethoxylated surfactant and alcohol micellar acidizing system is enhanced by controlling or selecting the molar ratio of alcohol to surfactant as a linearly increasing function of acid concentration. The oil solvency is further enhanced and selectively controlled by addition of an oil solvent (e.g., aromatic hydrocarbons, aromatic acid esters, ketones, $CS_2$, etc.) to the micelle.

22 Claims, 3 Drawing Sheets

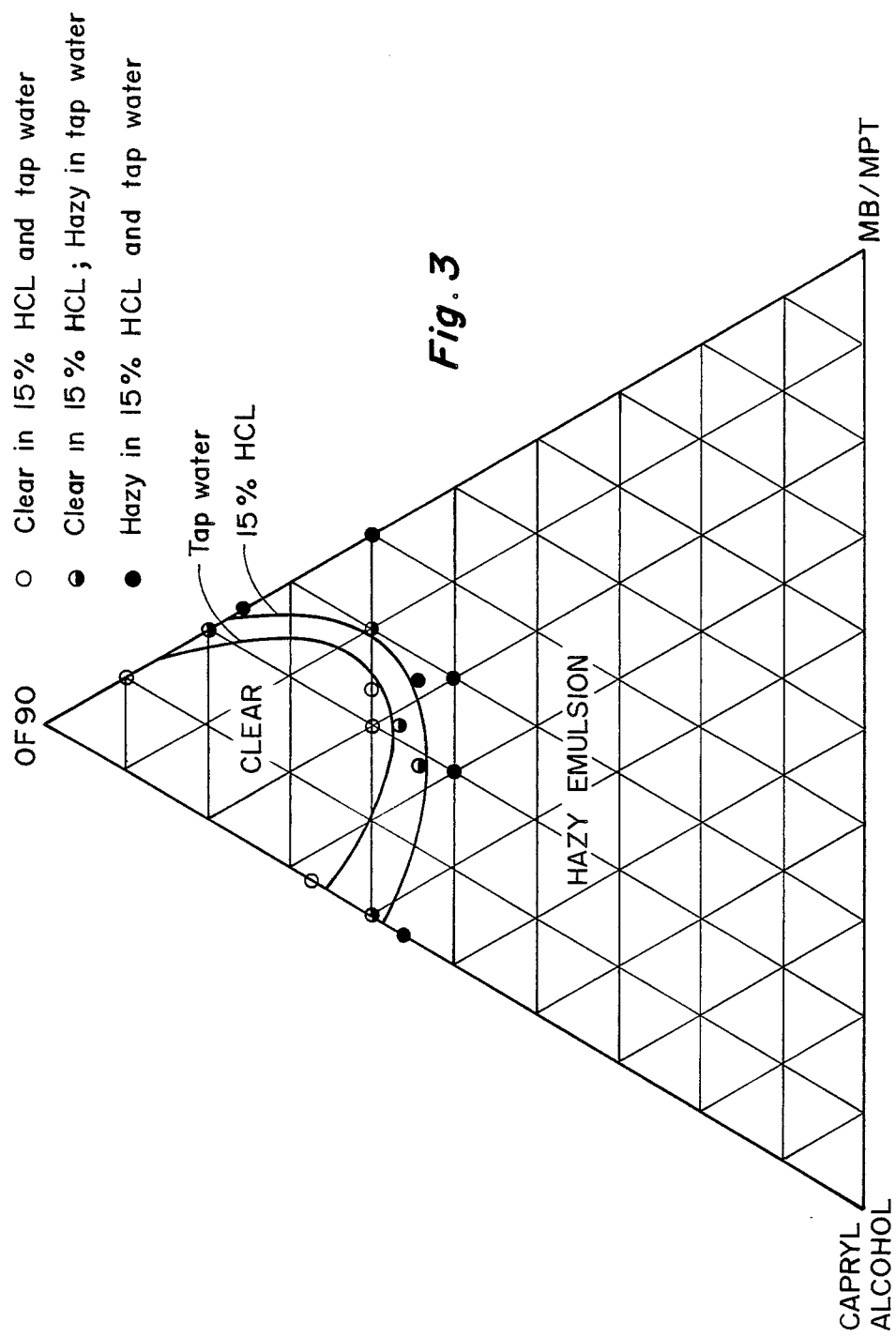

SURFACTANT SOLVENT COMPOSITION

This is a continuation of application Ser. No. 505,790, filed June 20, 1983, now abandoned.

BACKGROUND OF THE INVENTION

1. Field of the Invention

This invention relates to a surfactant solvent composition and the use thereof. More specifically, this invention relates to the enhancing of the oil solvency characteristic of an acidic surfactant solution involving an oxyalkylated surfactant and a high molecular weight alcohol.

2. Description of the Prior Art

The basic concept of enhancing the oil solvency property of an acidic surfactant solution has been of general consideration in a variety of applications and purposes. For example, oil solvency is of concern in something as simple as removal of a bathtub oil ring, toilet bowl cleaners and the like as well as in highly complex technology such as hydrocarbon production, oil and gas well stimulation, enhanced oil recovery and the like. More specifically, in acidizing an oil or gas well to clean up, stimulate and promote hydrocarbon production, various techniques to improve oil solvency and thus enhance solid wetting, lower interfacial tension between acid and oil, and break down emulsion sludges have been historically proposed with varying degrees of commercial acceptance and success. Generally, the most successful technical approaches to enhanced oil solvency can be viewed in terms of creating a single phase containing either a surfactant or mutual oil solvent (e.g., ethylene glycol monobutyl ether) or a cosolvent system (e.g., octyl alcohol/isopropyl alcohol, see U.S. Pat. No. 3,819,520).

In a copending U.S. application by the present inventor, Ser. No. 310,899, a third approach to enchancing oil solvency of an is disclosed wherein a micellar acidic solvent is employed wherein the micelles of the system exhibit desirable properties superior to the previously known mutual or cosolvent system. The present invention is viewed as an improvement in the micellar acidizing solvent system of the above patent application wherein the improvement results in a surfactant solvent system of broader applicability than oil well acidizing. For further details and description of such a micellar acidic solvent system see U.S. Ser. No. 310,899 which is incorporated herein by reference for such purpose.

SUMMARY OF THE INVENTION

The present invention involves the recognition by the inventor that a stoichiometric relationship exists between the higher alcohol and the oxyalkylated surfactant employed in a micellar acidizing solvent system. The present invention further involves the recognition that this stoichiometry is a function of the acidity (e.g., varies linearly with pH) of the solution in a manner that is suggestive of a complex being formed between the higher alcohol and the so-called palisade region of the surfactant molecule within the micelle and particularly that portion of the surfactant containing the oxyalkylated polymeric chain. Although it should be appreciated that a definitive mechanistic description of the molecular interreaction within the liquid phase and the micelle is not known and thus, the scope and validity of the present invention should not be limited to a single proposed theory or mechanism, it is presently felt that the normally water insoluble, oil soluble higher alcohol is rendered acid soluble by the formation of a hydrogen bonded complex at each of the oxyalkylated units forming the polyoxyalkylated moiety of the surfactant. It is further believed that this complex formation is preceded by protonation at the oxyalkylated site, that the degree of protonation is a function of acidity with oxypropylene units protonating at low acidity and oxyethylene units protonating with increased acid strength, and the desired molar ratio of higher alcohol to surfactant will similarly increase with increasing acidity.

Thus, according to the present invention, I have discovered an acidic surfactant composition comprising a continuous aqueous acid solution phase containing a dispersed surfactant micellar phase characterized in that the hydrophobic end of the surfactant molecule is derived from propoxylation of an organic monohydric alcohol and the hydrophilic end of the surfactant molecule is derived from subsequent ethoxylation with or without terminal esterification and an oil soluble, substantially water insoluble alcohol solubilized in the dispersed micellar phase, the specific improvement comprising: the molar ratio of the alcohol to the surfactant being selected as a function of the acidity of the aqueous acid solution phase with the numerical value of the molar ratio being substantially equal to the average number of ether oxygens bonded to the propylene oxide units of the surfactant molecule at low acidity of substantially zero weight percent acid and increasing essentially linearly in value with increasing acidity to a molar ratio approaching a numerical value essential equal to the total number of ether oxygens bonded to the sum of propylene oxide units and ethylene oxide units of the surfactant molecule at high acidity.

Preferably, the higher alcohol is a $C_4$ to $C_{11}$ aliphatic alcohol or an alcohol of the formula:

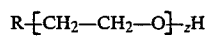

where R is an alkyl substituted phenyl group, an aliphatic alcohol residue of up to 20 carbons, or a fatty acid residue of 10 to 20 carbons, a polypropylene oxide chain or polybutylene oxide chain and z is an integer from about 2 to 8.

According to the present invention, the aqueous acid phase can be a water solution of a conventional mineral acid including HCl, $H_2SO_4$, and the like, an organic acid such as acetic acid and the like or it can be a water and $CO_2$ phase such as used in enhanced oil recovery and $CO_2$ flooding.

Thus, the present invention further provides an enhanced oil recovery process wherein inplace hydrocarbons are recovered from at least one production well by virtue of injecting a carbon dioxide/water displacement fluid into at least one injection well, the specific improvement comprising: adding to the carbon dioxide/water displacement fluid a surfactant as described above and a corresponding stoichiometric amount of an alcohol also as described above.

The present invention further provides that a significant fraction of the apparently stoichiometric amount of the alcohol being added to the acidic surfactant solution can be replaced with an oil soluble organic solvent (e.g., aromatic hydrocarbons, aromatic acid esters, ketones, etc.) as well as oil solvents such as sulfolane and carbon disulfide. In this manner the oil solvency of the micellar acidic surfactant can be further selectively enhanced for specific end use applications.

It is an object of the present invention to provide an acidic surfactant solution of enhanced oil solvency. It is a further object to provide an acidic surfactant/alcohol solution which is useful to solubilize a variety of organic compounds. It is still another object to provide a surfactant/alcohol micellar acidizing solution with or without a dissolved oil solvent which can be employed in a variety of applications. Fulfillment of these objects and the presence and fulfillment of other objects will be apparent upon complete reading of the specification and claims when taken in conjunction with the attached drawings.

BRIEF DESCRIPTION OF THE DRAWINGS

FIG. 3 is a ternary diagram illustrating the solution behavior of two and three component compositions at two acidity levels.

DESCRIPTION OF THE PREFERRED EMBODIMENTS

Figure 1:
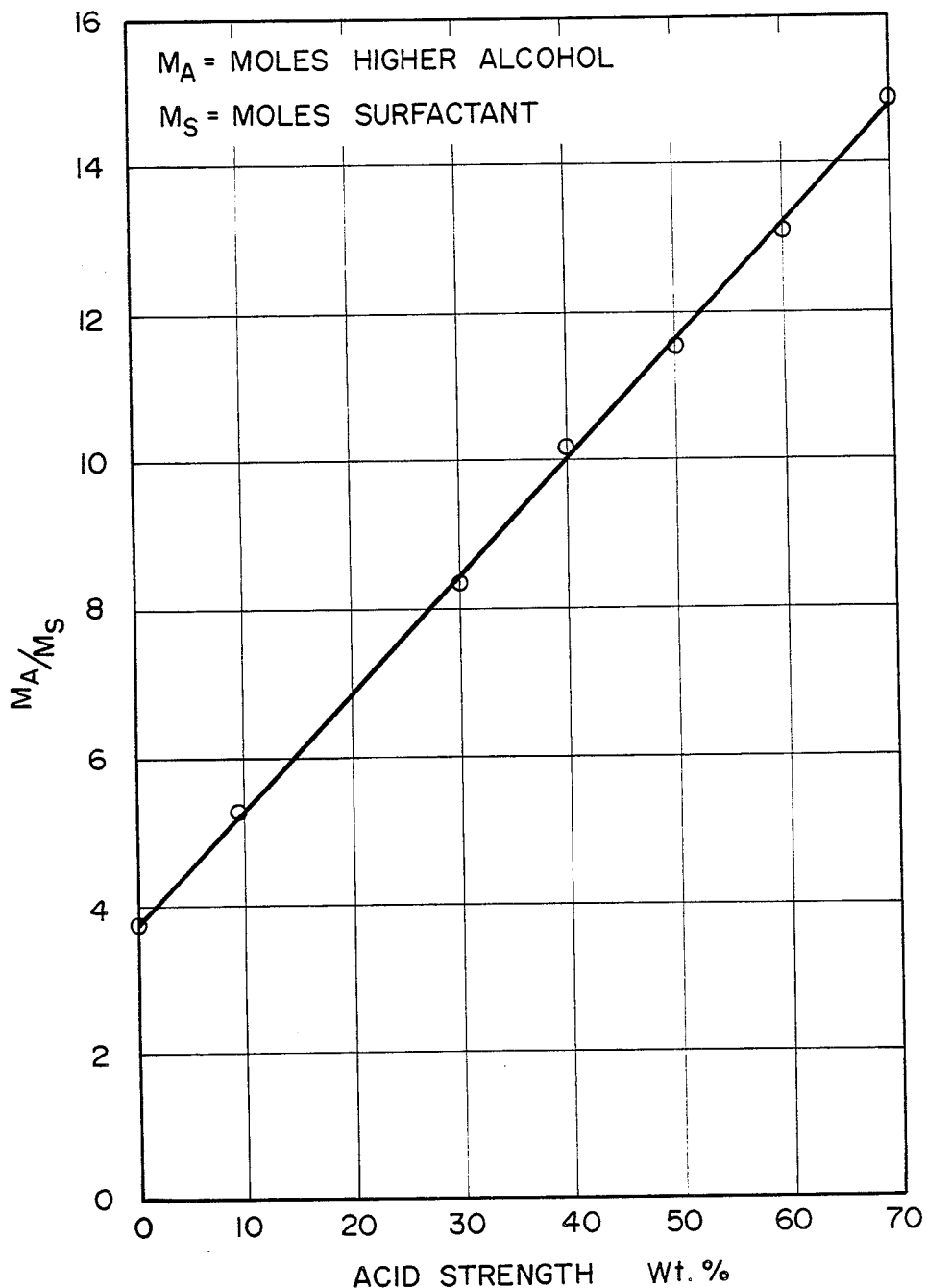
FIG. 1 illustrates a plot of the molar ratio of alcohol to surfactant as a function of acidity according to the present invention.

According to the preferred embodiments of the present invention, the oil solvency of an acidic surfactant solution is enhanced and optimized by selectively blending an oxyalkylated surfactant and a higher alcohol into an aqueous phase wherein the relative amount of oxyalkylated surfactant to higher alcohol is selected and maintained as a function of the acid strength of the aqueous acid phase. More specifically, the preferred embodiments of the present invention involve varying or selecting the molar ratio of alcohol to surfactant as an essentially linear increasing function of the acid strength of the continuous aqueous phase. Thus, the resulting micellar solution of the present invention will contain micelles made up of a surfactant and alcohol in a ratio that increases in relative alcohol content as the acid strength increases. Further, according to the preferred embodiments of this invention, the alcohol being incorporated into the micelle can either be supplemented with or partially substituted by an oil soluble, normally water insoluble, organic solvent. In order to better understand and more accurately explain the nature and basis for the improved acidic surfactant solvent compositions of the present invention, a description of the individual components making up the micellar acid solution and a description of their interrelationship to each other is appropriate.

The aqueous acid representing the continuous phase of the micellar solutions according to the present invention can be, in principle, any water soluble acid. The actual selection of the particular acid to be employed will depend upon the application to which the acidic micellar solution is intended. Thus, for example, the reducing versus oxidizing properties can be tailored by selection of a specific acid or mixtures thereof; similarly, in applications requiring metal pacification, rust removal, cation chelation, rust inhibition or the like the desired properties can be tailored by virtue of selecting the acid used in the aqueous phase. The acids used in the present invention include by way of example, but not limited thereto, the common inorganic and mineral acids such as HCl, $H_2CO_3$, $H_2SO_3$, $HNO_3$, $H_3PO_4$, sulfamic and the like, organic acids such as formic, acetic, propionic, gluconic, citric, hydroxyacetic (glycolic), diglycolic, oxalic, aminocarboxylic (especially nitrilo acetic),amino polyalkyl phosphonic, EDTA, hydroxy EDTA, glutaric, malonic, tartaric, succinic, maleic, salicylic, benzoic, toluic, lactic, amino benzoic, polyacrylic, adipic, mixtures thereof and their anhydrides. Carbon dioxide and water solutions also represent useful aqueous acid continuous phase for purposes of the present invention, particularly in enhanced oil recovery applications.

The surfactants employed to render the high molecular weight alcohol soluble in acid solution are categorically oxyalkylated alcohols or phenols which may or may not be terminally esterified, thus potentially forming mixtures of mono and diesters. In the esterified form, the surfactant is an anionic detergent and in the nonesterified form can be considered a nonionic detergent wherein the hydrophilic or water soluble moiety is a terminal ethylene oxide chain. Thus, the particularly preferred surfactants of the present invention are characterized by the chemical formula:

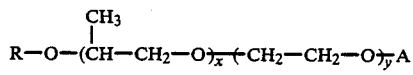

where R is an alkyl or alkyl-aryl radical of about $C_6$ to $C_{20}$, A is a radical selected from the group consisting of —PO(OH)$_2$, —PO(OH)[OCH$_2$CH$_2$]$_y$[OCH$_2$CH(CH$_3$)]$_x$OR, —SO$_3$H, SO$_2$H, and —H, x is a number corresponding to the degree of propoxylation and y is a number corresponding to the degree of ethoxylation.

In the broadest sense, R is any hydroxylated organic substitutent that after oxyalkylation represents or contributes the necessary hydrophobic character to one end of the resulting surfactant molecule. Commerically, fatty alcohols and alkyl phenols are frequently employed as starting materials for the subsequent oxyalkylation. In principle, the oxyalkylation can involve other alkylene oxides other than propylene oxide and ethylene oxide provided the terminal sequence is predominantly ethylene oxide for water solubility or hydrophilic character. Preferably, the oxyalkylation is a block polymer of propylene oxide followed by ethylene oxide. However, in addition to the incorporation of other alkylene oxides, particularly near the starting alcohol moiety, one or more moles of ethylene oxide can be readily and advantageously employed initially to promote the oxyalkylation reaction as well known in the art. Thus, the term block polymer when used to describe the polyether moiety of the surfactant molecule is referring generally to the presence of a terminal ethylene oxide chain and the reference to block propylene oxide/ethylene oxide also includes other alkylene oxides in the propylene oxide portion including initiation of the oxyalkylation reaction with an ethylene oxide.

The presence and degree of the terminal esterification and the selection of the acid or equivalent used to esterify the ethylene oxide chain will depend on the particular end use of the acidic surfactant/alcohol solution. If high surface absorption is desired, then the sulfate ester and/or phosphate ester may be appropriate. If no surface absorption is desired, then the nonesterified nonionicform of the surfactant may be preferred. In such cases, the relative degree of ethoxylation can be increased to insure water solubility. Similarly, the viscosity, solubility and absorptivity of the resulting acidic solution can be adjusted by varying the degree of oxyalkylation and esterification of the surfactant. Thus, it is envisioned that for example in enhanced oil recovery applications, such as a $CO_2$ flood, the nonionic (nonesterified) surfactant would be preferred (minimum adsorption), while for well stimulation and cleaning, the phosphate ester seems to be the best approach. Selected other end uses may dictate the employment of the sulphate ester. The actual method of esterification can be by any technique well known in the art.

The particularly preferred phosphate ester surfactants useful in the present invention are the phosphate esters of the oxyalkylated fatty alcohols and the like as described in U.S. Pat. No. 3,629,127, herein incorporated by reference as descriptive thereof.

The higher molecular weight alcohol to be added to the oxyalkylated surfactant and thus incorporated into the micelle can be essentially any $C_4$ to $C_{11}$ substantially water insoluble alcohol. All such alcohols in combination with the oxyalkylated surfactant and acid solution have been found to be effective in disintegrating and dispersing oil deposits, sludges and emulsions. They produce an essentially oil-free aqueous phase and a water-free oil phase leaving the surfaces of the solid water wet with no apparent emulsion formation. The $C_6$ to $C_8$ alcohols are preferred in that the rate of disintegration and dispersion of the oily sludges is faster within this range. The closely related isomeric branched-chain $C_8$ alcohols commercially available as capryl alcohol, isooctyl alcohol or 2-ethyl hexanol are particularly preferred.

While the above oil soluble, substantially water insoluble monohydric alcohols are preferred, other alcohols having similar solubility and hydrophile/lipophile balance (HLB) to the $C_6$ to $C_8$ alcohols may be employed. For example, the solubility and HLB of very high molecular weight ($C_{12}$–$C_{22}$) fatty alcohols, polypropylene or polybutylene glycols, alkyl substituted phenols and $C_{12}$–$C_{22}$ fatty acids can be shifted to the operable range by reacting these with a few moles of ethylene oxide. The resulting substances, having the required oil solubility and at least one terminal hydroxyl group to provide alcoholic character, can be represented by the general formula:

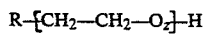

where R is an alkyl substituted phenyl group, an aliphatic alcohols residue of up to 20 carbons, or a fatty acid residue of 10 to 20 carbons, a polypropylene oxide chain or a polybutylene oxide chain and z is an integer from about 2 to 8.

In preparing the acidic surfactant/alcohol solution, it is preferred that the surfactant and high molecular weight alcohol be preblended, thus producing a concentrated additive that is then mixed with the aqueous acid phase. However, the mixing of the aqueous acid solution with the surfactant and alcohol in any sequential order is equivalent for purposes of this invention. Various other techniques for preparing and handling such micellar acidic solutions can be found in the previously referenced copending application Ser. No. 310,899.

The amount of the surfactant/alcohol added to the aqueous acid phase can vary significantly depending on the particular end use and the required oil solvency for that aqueous acid phase in that particular application. Generally, acid solutions containing from 0.01 to 25 volume percent surfactant/alcohol can be readily achieved and satisfy most end uses. However, and as previously stated, the novelty of the present invention involves the recognition that an optimum stoichiometric relationship exists between the higher alcohol and oxyalkylated surfactant being employed in the aqueous acid solution and that this optimum stoichiometric relationship is a function of the acidity of the solution in a manner that is suggestive of a complex being formed between the higher alcohol and the oxyalkylated moiety of the surfactant molecule. In other words, to achieve the optimum oil solvency and surface face active properties, the ratio of alcohol to surfactant is selected as a function of the acidity and the molecular structure of a portion of the surfactant molecule.

EXAMPLE I

In order to demonstrate and verify the molar ratio dependency and apparent stoichiometric relationship between the higher alcohol and oxyalkylated surfactant, a series of aqueous acid solutions were prepared containing from 1 to 96% acid by weight in water. Baker reagent grade sulfuric acid was used for acid concentrations greater than 30 weight percent and reagent grade hydrochloric acid was used for lower acid strengths. To each aqueous acid solution was added 5 volume percent isooctyl alcohol followed by vigorous mixing. The higher alcohol in each case oiled out forming two phases characteristic of the higher alcohol being insoluble in the aqueous acid solution. Each immiscible sample was then titrated with small incrementable quantities of surfactant. The particular surfactant employed was a commercial grade liquid oxyalkylated phosphate ester sold under the trade name Pluroflo OF90 by BASF Wyandotte. Between incremental additions of the surfactant, the respective alcohol/acid samples were vigorously stirred and then allowed to stand for sufficient time to allow phase separation to take place. The addition of the surfactant was continued until a single phase characteristic of a clear stable micellar solution was achieved. A mixture representing solubilization of the higher alcohol at very low acidity was prepared by blending 5 volume percent isooctyl alcohol into Tulsa city tap water and then titrating in the surfactant until a clear solution was obtained. The tap water contained only the acidity produced by $CO_2$ from the air at atmospheric pressure.

The final composition of the single phase micellar solution was computed for each sample. The weight ratio of the surfactant to alcohol was plotted on semilog paper as a function of the concentration of the acid (weight percent acid). The resulting plot characteristic of the log of the weight of surfactant to weight of higher alcohol appeared to be inversely proportional to the concentration of the acid over the range of about 1 to 70 percent acid. This data indicates that increasing acid strength promotes the ability of the surfactant to retain the higher alcohol in the micelle and implies that a 3 component complex (surfactant/alcohol/hydrogen ion) and associated stoichiometry may be involved in the micelle.

To further explore the possibility of a stoichiometric relationship existing between the surfactant/alcohol and acid the respective weight ratios of the surfactant to alcohol to moles converted to a ratio of the moles of higher alcohol to moles of surfactant and again plotted as a function of acid strength of the solution. In order to accomplish this, the average molecular structure of the OF90 surfactant was approximated by assuming that the average composition corresponds to a $C_{11}$ aliphatic alcohol having been oxyalkylated with an average of 2 moles of propylene oxide and 14 moles of ethylene oxide before being phosphorylated with $P_2O_5$, thus forming a mixture of 70 percent monoester and 30 percent diester FIG. 1 of the drawing illustrates the resulting plot of the moles of alcohol to moles of surfactant (i.e., the molecular ratio of alcohol to surfactant; Ma/Ms) as a function of acid strength (i.e., percent by weight acid). The zero acid strength point is represented by tap water as explained above. Clearly the number of moles of alcohol incorporated into the micelle per mole of surfactant increases as the acidity of the solution increases. Apparehtly, the ability of the surfactant to dissolve, or more specifically incorporate, the higher alcohol into the soluble micelle form is greater at high acidity than at low acidity. In other words, a greater relative number of alcohol molecules can complex with a surfactant molecule when the acidity of the solution is increased.

In comparing the specific numerical values of the molar ratio illustrated in FIG. 1 to the molecular structure of the oxyalkylated surfactant molecule, the slightly less than 4 moles of alcohol per mole of surfactant characteristic of low acidity corresponds essentially to the number of ether oxygens bonded to the propylene oxide units present in the oxyalkylated chains of the mixed ester surfactant. The increase in the molar ratio with increasing acidity approaches, at high acidity, a numerical value that corresponds essentially to the total number of ether oxygens associated with the sum of the propylene oxide and ethylene oxide units in the oxyalkylated chain. Although the numerical values are not necessarily explicitly identical to the respective degrees of propoxylation and ethoxylation of the average molecular structure, the overall trend is highly suggestive of the propylene oxide ether linkage being exclusively involved in complexing with the alcohol at low acidity and the ethylene oxide linkages being progressively involved with complexing of the alcohol at progressively higher acid strengths. This basic trend, for purposes of this invention, is analogous to and the basis for what is referred hereinto as 'the molar ratio corresponds to the average degree of propoxylation and/or ethoxylation of the surfactant molecule'. This observation is also the basis for the previous statement that mechanistically it is felt that the actual complex formation involves attachment, possibly hydrogen bonding of the alcohol, at the ether oxygens of the surfactant and is preceded with a protonation of that site by the hydrogen ion, or more specifically, hydronium ion of the acid phase. Again, however, this mechanistic description should be viewed as merely one plausible explanation of what may or may not be taking place, while the fundamental observation is factually one of incorporating a relatively larger quantity of the oil soluble alcohol into the micellar solution as a function of the acidity of the aqueous phase.

EXAMPLE II

Figure 2:
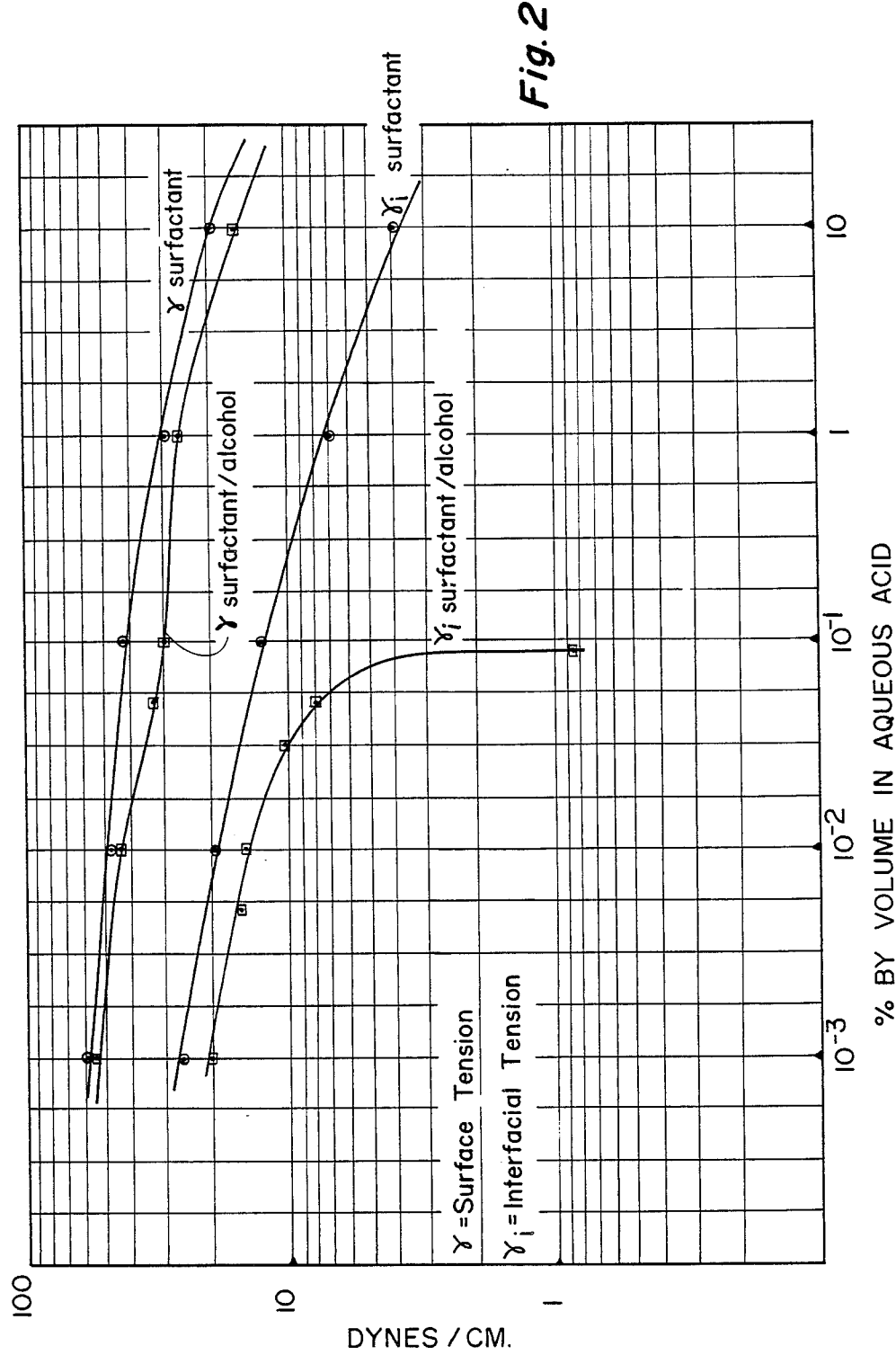
FIG. 2 illustrates the behavior of surface tension and interfacial tension as a function of concentration of an acidic surfactant solution compared to an acidic surfactant/alcohol solution.

In order to better illustrate and explain the nature of the desirable solution properties observed for the surfactant/alcohol complex of the present invention relative to the surfactant solution without the alcohol, a series of surface tension and interfacial tension measurements were made. The measurements were performed on both the surfactant and the surfactant in combination with the higher alcohol in acidic aqueous solution. The particular surfactant employed was a liquid phosphate ester of an oxyalkylated aliphatic alcohol sold under the trade name Klearfac AA270 by BASF Wyandotte. The alcohol employed was 2-ethyl hexanol. FIG. 2 illustrates the results of the measurements showing both surface tension and interfacial tension in dynes per centimeter as a function of additive concentration in an acid solution. The surface tension values are characteristic of the air to solution interface while the interfacial tension values are characteristic of a light liquid mineral oil to solution interface. The respective curves are illustrative of the difference between an acid surfactant solution and an acid surfactant with complexed alcohol. As illustrated, the lower interfacial curve for the surfactant/alcohol breaks sharply downward as a function of increasing concentration; dropping to extremely low values. In contrast, the interfacial tension curve of the surfactant acid solution without alcohol does not display a similar break or drop in interfacial tension.

This drastic drop in interfacial tension corresponds to interfacial miscibility between the micellar acid solution and the mineral oil. In other words, above a certain low concentration, the surfactant/alcohol complex apparently orients in both the oil and water phases adjacent to and across the interface in such a way that the interface is essentially eliminated. Such a transfer does not occur across the air-solution interface and thus the surface tension of the acidic surfactant/alcohol complex solution is not greatly different than that of the acidic surfactant solution alone.

In the preceding description of the surfactant/alcohol complex formation and the solubilization of the normally oil soluble alcohol into aqueous acidic solution, it is visualized that the alcohol and surfactant combine into stable micelles with hydrophilic portions of the complex oriented outwardly toward the solvating aqueous phase. At the oil-water interface, the orientation may be altered and structured micelles may no longer exist. However, the bulk of the stable micelles, made up of the surfactant/alcohol complex, remains and there is little or no stabilization of emulsion between the oil and water. When crude oil and the acidic water solution containing the surfactant/alcohol complex are thoroughly mixed, the phases blend easily, but rapidly gravity separate into clean layers with little or no emulsion turbidity. The lower aqueous phase takes on a color characteristic of micellar solubilized oil. Solubilization of water insoluble oil solvents is discussed in the next example.

EXAMPLE III

In order to illustrate the feasibility of substituting an oil solvent for a portion of the alcohol and to establish that the acidizing micellar solution can incorporate an oil or oil solvent into the micelle and thus serve as the solution medium for suspending and transporting a micelle with oil solvent, a series of fifteen solutions was tested. Each solution was a mixture of a surfactant, a higher alcohol and an organic solvent of varying relative concentration. To prepare the solutions, a selected weight of a commercially available oxyalkylated phosphate ester surfactant sold under the trade name OF90 was blended with specified weight of capryl alcohol and a selected weight of an oil solvent composition consisting of a mixture of essentially equal parts of methyl benzoate and methyl paratoluate and about 5% orthoxylene sold as DuPont MB/MPT. Two volume percent mixtures of each of the surfactant/alcohol/oil solvent blends were prepared using both 15% HCl and Tulsa city tap water as the aqueous media. The respective optical properties of the resulting micellar acidizing solutions were observed and recorded in TABLE I below. The apparent phase behavior of the micellar acidizing system is presented as a ternary diagram of FIG. 3.

TABLE I

| Test | Weight Percent in Blend | | | Solubility of Blend | |
|---|---|---|---|---|---|
| | OF90 Wt. % | Capryl Alcohol Wt. % | MB/MPT Wt. % | Tap Water | 15% HCl |
| 1 | 60 | — | 40 | hazy | hazy |
| 2 | 75 | — | 25 | hazy | hazy |
| 3 | 80 | — | 20 | hazy | clear |
| 4 | 90 | — | 10 | clear | clear |
| 5 | 56 | 44 | — | hazy | hazy |
| 6 | 60 | 40 | — | hazy | clear |
| 7 | 67 | 33 | — | clear | clear |
| 8 | 60 | 20 | 20 | clear | clear |
| 9 | 60 | 16 | 24 | clear | clear |
| 10 | 60 | 10 | 30 | hazy | clear |
| 11 | 56 | 22 | 22 | hazy | clear |
| 12 | 54 | 27 | 19 | hazy | clear |
| 13 | 50 | 30 | 20 | hazy | hazy |
| 14 | 54 | 19 | 27 | hazy | hazy |
| 15 | 50 | 20 | 30 | hazy | hazy |

As indicated in the above data and as illustrated in FIG. 3, the surfactant alone is capable of solubilizing some of the oil solvent (mixture of aromatic acid esters in this case) into acidic aqueous solution. A weight ratio of 4 parts surfactant to 1 part solvent is required at high acid strength (Test 3 in 15% HCl). An even higher ratio is required at low acid strength (Test 4 in tap water). Tests have shown that about the same surfactant to solvent ratio is required for solubilizing other oil solvents such as toluene or carbon disulfide. Thus, the surfactant alone is a relatively inefficient solubilizer for oil solvents in general, even in strong acids. The beneficial effect of acid for producing a clear stable solution is again illustrated by the data of Tests 6 and 7 which show the required weight ratio of surfactant to higher alcohol is 1.5/1 in 15% HCl and 2.0/1 in tap water. Again, this strongly indicates that a complex of rather definite proportions is formed between the surfactant and higher alcohol with the acid promoting complex formation. The surfactant/higher alcohol complex is a more powerful solubilizer for oil solvents than the surfactant alone as shown by Test 12 (15% HCl). Here the weight ratio of surfactant to higher alcohol is 2.0/1 (54/27) and the ratio of surfactant to total solvent (higher alcohol plus MB/MPT) is only 1.2/1. Thus, a greater amount of normally water or acid insoluble solvent can be incorporated per unit weight of surfactant. The 2.0/1 weight ratio of surfactant to higher alcohol is about the minimum for producing a complex which is soluble at low acidity and for producing a clear stable solution containing the oil solvent in strong acid. This is shown by Test 13 wherein the surfactant to higher alcohol is 1.7/1, the surfactant to total solvent is 1/1 and a clear solution is not obtained even in strong acid. By virtue of the chemical complex of the present invention formed by combining the surfactant and higher alcohol in specific proportions, the solvent and detergent properties of the final acidic aqueous solution can be varied by addition of various amounts and types of other solvents. Thus, the final solution properties can be tailored for specific applications, such as removal of oily soils from mineral, ceramic or metal surfaces The added solvent is also beneficial in preventing emulsion stabilization and for breaking down, liquefying and dissolving emulsion sludges that clog oil and gas wells and water injection wells, for example. Both the higher alcohol of the complex and the solubilized oil solvent facilitate reduction of interfacial tension between oil and the acidic aqueous solution of the complex plus solvent. The acidic aqueous solution containing the surfactant solvent of this invention, with or without additional oil solvent, readily displaces oil from surfaces and from porous media such as rock formations, leaving the surfaces preferentially water wet. The strongly polar terminal ester group on the surfactant, such as the phosphate group of OF90 or Klearfac AA270, probably aids detergency and water wetting of surfaces by the final acidic solution. However, the ester group is not involved in complexing the higher alcohol or in solubilizing other oil solvents such as MB/MPT, toluene and the like. Thus, for some applications, such as water flooding of earth formations for oil displacement and recovery, the surfactant used in preparing the surfactant solvent of this invention may possess a terminal hydroxy (—OH) group in lieu of the terminal ester group such as —PO(OH)$_2$ or —SO$_3$H for example. In this case, the surfactant is made by oxyalkylation of an oil soluble alcohol without final esterification with P$_2$O$_5$ or SO$_3$, for example. Elimination of the terminal ester group on the surfactant can be beneficial in such applications by reducing adsorption losses of the surfactant component. Further, in such applications where high acid strength is not required (no acid dissolution of solids needed) the acid component of the surfactant solvent of this invention may be a weak acid such as carbon dioxide. Thus, the surfactant solvent composition of this invention, particularly a composition composed of a nonester surfactant and higher alcohol with or without added oil solvent, appears ideally suited as an additive in enhanced oil recovery operations utilizing CO$_2$ to facilitate more complete displacement and recovery of oil.

EXAMPLE IV

To further demonstrate how an oil solvent can be advantageously incorporated into a micellar acidizing solution, an acidic micellar concentrate solution was prepared by admixing the following ingredients with agitation as stated in the following table.

TABLE II

| Constituent | Weight Percent |
|---|---|
| OF90 surfactant | 16 |
| Capryl Alcohol | 5 |
| Toluene | 4 |
| Citric Acid | 20 |
| H$_2$O | 55 |

A portion of the above concentrate was diluted with water in a ratio of 1 part concentrate to 5 parts water by volume. The resulting diluted acidic solution was liberally applied directly to the soap scum, dirt and oil deposits found on the ceramic tile, chrome plated hardware and plastic door (polymethylmethacrylate) in a home shower stall. The usually hard to remove scum came off easily, leaving a clean water wet surface without the use of an abrasive or hard rubbing.

EXAMPLE V

Additional tests were made to demonstrate the ability of the surfactant solvent composition of this invention to disperse and suspend fine acid insoluble particulate matter and to promote foaming of aqueous acid solutions. A series of tests were made by dissolving 1 volume percent of each additive listed below into water containing 10 weight percent HCl acid. To each 100 ml of final solution was added 1 gram of −200 mesh kaolinite clay. Each mixture was thoroughly agitated and then allowed to stand quiescent while foam height over the solution and relative rate of settling of insoluble clay particles were observed.

TABLE III

| Test | Additive Composition |
| --- | --- |
| 1 | OF90 surfactant as is |
| 2 | OF90, 60 wt. percent |
|   | Capryl alcohol, 40 wt. percent |
| 3 | OF90, 60 wt. percent |
|   | Capryl alcohol, 25 wt. percent |
|   | Toluene, 15 wt. percent |
| 4 | OF90, 50 wt. percent |
|   | Capryl alcohol, 20.4 wt. percent |
|   | Toluene, 18.1 wt. percent |
|   | Monaquat AT1074, 11.5% wt. percent |

*Monaquat AT1074 is a water soluble cationic quaternary ammonium chloride sold by Mona Industries, Inc.

Comparative tests showed that the kaolinite clay stayed suspended approximately 4 times longer in Tests 1, 2 and 3 than in untreated 10% HCl with no additive. Little or no difference was noted in clay suspension time in these three tests. However, foam stability in Test 3 was 3 to 4 times greater than that of Test 1 and 2 as indicated by time required for the foam layer to collapse. Enhancement of foam was also noted in Test 3 when crude oil was added and the mixtures were re-shaken, as compared to Tests 1 and 2. No entrainment of clay into the oil was observed in Tests 2 and 3 whereas in Test 1 presence of oil wetted clay and viscous interfacial emulsion was observed.

The composition of Test 4 suspended clay and stabilized foam for approximately twice as long as that of Test 1, 2 and 3. This illustrates that addition of a soluble cationic surfactant (e.g., quaternary ammonium salts and alkyl substituted imidazolines or the like) to the acidic surfactant solvent of this invention can beneficiate foaming and clay suspension for applications where these effects are desirable. The mixture of Test 4 in acid solution was found to blend readily with oils and to decompose and dissolve viscous emulsion sludges in the same manner as the surfactant solvent without a cationic component.

The advantages and uses of the micellar acidizing solutions according to the present invention are felt to be numerous. The compositions have a wide range of applications including surface cleaning, detergency, oil displacement, water wetting, suspension of particulate solids, solubilization of normally immiscible liquids, reduction of liquid-liquid interfacial tensions and enhancement of oil solvency at liquid-solid and liquid-liquid interfaces. These advantages are achieved individually or collectively and occur in combination with the advantage and utility of having an aqueous acid phase present. Consequently, the compositions of the present invention will be useful in a broad range of specific applications including technically complex uses such as stimulating and cleaning oil and gas wells or the like, secondary and tertiary oil recovery processes including $CO_2$ floods, as well as a variety of cleaning and surface treating applications, such as cleaning drums, storage tanks, reaction vessels or the like and relatively simple or mundane applications, such as toilet bowl cleaning, cleaning driveways or washing utensils and equipment of the like.

Having thus described the preferred embodiments of the invention with a certain degree of particularity, it is to be recognized and understood that many changes can be made in the details of preparing and using the micellar surfactant/alcohol acidizing solution without departing from the spirit and scope of this disclosure. Thus, it is contemplated that the surfactant/alcohol and the surfactant/alcohol/oil solvent phases constituting the micelle can be added to a continuous aqueous acid phase at a variety of overall concentrations, thus forming acid micellar solutions of varying percent organic phase activity yet the novel concept of varying the relative quantity of surfactant to alcohol or surfactant to combined alcohol and oil solvent as a function of acidity to achieve optimum solution properties is preserved consistent with the present invention. Therefore, it is to be understood that the invention is not limited to the embodiments set forth herein for purposes of exemplification, but is to be limited only by the scope of the attached claims including a full range of equivalency to which each element thereof is entitled.

I claim:

1. An acidic surfactant composition comprising a continuous aqueous acid solution phase containing a dispersed micellar surfactant phase characterized in that the hydrophobic end of the surfactant molecule is derived from propoxylation of an organic monohydric alcohol and the hydrophilic end of the surfactant molecule is derived for subsequent ethoxylation with or without further reaction to form a terminal sulfate group and an oil soluble, substantially water insoluble alcohol solubilized into the dispersed micellar phase, the molar ratio of the alcohol to surfactant being selected as a function of the acidity of the aqueous acid solution phase with the numerical value of said molar ratio being substantially equal to the average number of ether oxygens bonded to the polypropylene oxide units of the surfactant molecule at low acidity of substantially zero weight percent acid and increasing essentially linearly in value with increasing acidity to a molar ratio approaching a numerical value essentially equal to the total number of ether oxygens bonded to the sum of the propylene oxide units and ethylene oxide units of the surfactant molecule at high acidity.

2. An acidic surfactant composition of claim 1 wherein the oil soluble, substantially water insoluble alcohol is a $C_4$ to $C_{11}$ aliphatic alcohol.

3. An acidic surfactant composition of claim 2 wherein a substantial portion of said alcohol is replaced by an oil solvent selected from the group consisting of aromatic hydrocarbons, alkyl substituted aromatic hydrocarabons, aromatic acid esters, alkyl substituted aromatic acid esters, ketones, terpenes, $C_3$ to $C_{20}$ aliphatic hydrocarbons, polypropylene glycol, sulfolane, carbon disulfide, and mixtures thereof.

4. An acidic surfactant composition of claim 1 wherein said surfactant is a block propoxylated/ethoxylated surfactant or a block ethoxylated/propoxylated/ ethoxylated surfactant, wherein the inital ethoxylation is limited to essentially one mole of ethylene oxide per mole of starting monohydric alcohol.

5. An acidic surfactant composition of claim 4 wherein said aqueous acid solution is a water and $CO_2$ phase.

6. An acidic surfactant composition of claim 4 wherein said aqueous acid solution is a water and chelating acid phase.

7. An acidic surfactant composition of claim 1 further comprising an oil solvent selected from the group consisting of aromatic hydrocarbons, alkyl substituted aromatic hydrocarbons, aromatic acid esters, alkyl substituted aromatic acid esters, ketones, terpenes, $C_3$ to $C_{20}$ aliphatic hydrocarbons, polypropylene glycol, sulfolane, carbon disulfide, and mixtures thereof.

8. The micellar acidic surfactant composition of claim 1, including an oil solvent to substantially enhance the oil solvency of said micellar acid surfactant composition.

9. A micellar acid surfactant composition of claim 8 wherein said oil solvent is selected from the group consisting of aromatic hydrocarbons, alkyl substituted aromatic hydrocarbons, aromatic acid esters, alkyl substituted aromatic acid esters, ketones, terpenes, $C_3$ to $C_{20}$ aliphatic hydrocarbons, polypropylene glycol, sulfolane, carbon disulfide, and mixtures thereof.

10. An improved acidic surfactant composition of claim 1 further comprising a silt suspending foaming agent selected from the group consisting of an acid soluble cationic surfactant, a cationic quaternary ammonium salt, an alkyl substituted imidazoline or mixtures thereof.

11. A method of enhancing the oil solvency characteristics of an acidic surfactant composition comprising an aqueous acid solution phase containing a surfactant characterized in that the hydrophobic end of the surfactant molecule is derived from propoxylationof an organic monohydric alcohol and the hydrophilic end of the surfactant molecule is derived from subsequent ethoxylation with or without further reaction to form a terminal sulfate group and an oil soluble, substantially water insolube alcohol, comprising the steps of selecting the relative concentration of said alcohol to said surfactant such that the molar ratio of the alcohol to surfactant is a function of the acidity with the numberical value of said molar ratio being substantially equal to the average number of ether oxygens bonded to the propylene oxide units of the surfactant molecule at low acidity of substantially zero weight percent acid and increasing essentially linearly in value with increasing acidity to a molar ratio approaching a numerical value essentially equal to the total number of ether oxygens bonded to the sum of the propylene oxide units and ethylene oxide units of the surfactant molecule at high acidity.

12. A method according to claim 11 wherein the alcohol is a $C_4$ to $C_{11}$ aliphatic alcohol.

13. A method according to claim 11 wherein said surfactant is a non esterfied non ionic.

14. A method according to claim 13 wherein said aqueous acid solution is a water and $CO_2$ phase.

15. A method according to claim 11 wherein a substantial portion of said alcohol is replaced by an oil solvent selected from the group consisting of aromatic hydrocarbons, alkyl substituted aromatic hydrocarbons, aromatic acid esters, alkyl substituted aromatic acid esters, ketones, terpenes, $C_3$ to $C_{20}$ aliphatic hydrocarbons, polypropylene glycol, sulfolane, carbon disulfide, and mixtures thereof.

16. An enhanced oil recovery process wherein in-place hydrocarbons are recovered from at least one production well by virture of injecting a carbon dioxide/water displacement fluid into at least one injection well, comprising the steps of:
(a) adding to said carbon dioxide/water diplacement fluid a surfactant characterized by the chemical formula:

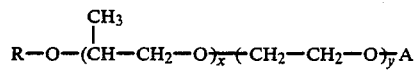

where R is an alkyl or alkyl-aryl radical of about $C_6$ to $C_{20}$, A is a radical selected from the group consisting of —OH, and —$SO_3H$, x is a number corresponding to the degree of propoxylation and y is a number corresponding to the degree of ethoxylation;

(b) adding to said carbon dioxide/water displacement fluid an oil soluble, substantially water insoluble selected from the group consisting of a $C_4$ to $C_{11}$ aliphatic alcohol and an alcohol of the formula:

where R is an alkyl substituted phenyl group, an aliphatic alcohol residue of up to 20 carbons, or a fatty acid residue of 10 to 20 carbons, a polypropylene oxide chain or polybutylene oxide chain and z is an integer from about 2 to 8, wherein the relative quantity of said alcohol present is such that the molar ratio of said alcohol to said surfactant a linear function of the acidity starting at a molar ratio substantially equal to the average number of ether oxygens bonded to the propylene oxide units of said surfactant at low acidity of substantially zero weight percent acid and increasing essentially linearly in value with increasing acidity to a molar ratio approaching a numerical value essentially equal to the total number of ether oxygens bonded to the sum of the propylene oxide units and ethylene oxide units the surfactant molecule at high acidity.

17. An enhanced oil recovery process of claim 16 wherein the alcohol is a $C_4$ to $C_{11}$ aliphatic alcohol.

18. An enhanced oil recorvery process of claim 17 wherein said surfactant is a block propoxylated/ethoxylated surfactant and A is —H.

19. An improved acidic surfactant composition comprising:
(a) An aqueous acid solution;
(b) a surfactant characterized by the chemical formula:

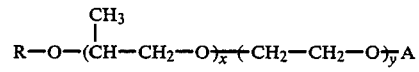

where R is an alkyl or alkyl-aryl radical of about $C_6$ to $C_{20}$, A is a radical selected from the group consisting of —$SO_3H$, and —H, x is a number corresponding to the degree of propoxylation and y is a number corresponding to the degree of ethoxylation; and (c) an oil soluble, substantially water insoluble alcohol selected from the group consisting of a $C_4$ to $C_{11}$ aliphatic alcohol and an alcohol of the formula:

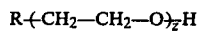

where is an alkyl substituted phenyul group, an aliphatic alcohol residue of up to 20 carbons, or a fatty acid residue of 10 to 20 carbons, a polypropylene oxide chain or polybutylene oxide chain and z is an integer from about 2 to 8, wherein the relative quantity of said alcohol present is selected such that molar ratio of said alcohol to said surfactant is essentially a linear function of the acidity starting at a molar ratio substantially equal to the average number of ether oxygens bonded to the propylene oxide units of said surfactant at low acidity of substantially zero weight percent acid and increasing linearly in value with increasing acidity to a molar ratio approaching a numerical value essentially equal to the total number of ether oxygens bonded to the sum of the propylene oxide units and ethylene oxide units of the surfactant molecule at high acidity.

20. An improved acidic surfactant composition of claim 19 wherein the alcohol is a $C_4$ to $C_{11}$ aliphatic alcohol.

21. An improved acidic surfactant composition of claim 19 further comprising an oil solvent selected from the group consisting of aromatic hydrocarbons, alkyl substituted aromatic hydrocarbons, aromatic acid esters, alkyl substituted aromatic acid esters, ketones, terpenes, $C_3$ to $C_{20}$ aliphatic hydrocarbons, polypropylene glycol or polybutylene glycol, sulfolane, carbon disulfide, and mixtures thereof.

22. An improved acidic surfactant composition of claim 19 further comprising a silt suspending foaming agent selected from the group consisting of an acid soluble cationic surfactant, a cationic quaternary ammonium salt, an alkyl substituted imidazoline or mixtures thereof.

* * * * *

UNITED STATES PATENT AND TRADEMARK OFFICE
CERTIFICATE OF CORRECTION

PATENT NO. : 4,738,789

DATED : April 19, 1988

INVENTOR(S) : Loyd D. Jones

It is certified that error appears in the above-identified patent and that said Letters Patent is hereby corrected as shown below:

Col. 3, line 68 "$H_2SO_3$" should be --$H_2SO_4$--

Col. 4, line 66 "ionicform" should be --ionic form--.

Col. 6, line 11 cancel "face".

Col. 6, line 65 "to moles" should be --were--

Col. 7, line 16 change "Apparehtly" to --Apparently--.

Col. 12, line 58-59 "hydrocarabons" should be --hydrocarbons--.

Col. 13, line 36 "propoxylationof" should be --propoxylation of--.

Col. 13, line 44-45 "numberical" should be --numerical--.

Col. 14, line 16 "-OH" should be -- -H --.

Col. 14, line 34 after "surfactant" insert -- is essential --.

UNITED STATES PATENT AND TRADEMARK OFFICE
CERTIFICATE OF CORRECTION

PATENT NO. : 4,738,789

DATED : April 19, 1988

INVENTOR(S) : Loyd D. Jones

It is certified that error appears in the above-identified patent and that said Letters Patent is hereby corrected as shown below:

Col. 14, line 44 after "units" insert --of --.

Col. 15, line 6 "phenyul" should be --phenyl--.

Signed and Sealed this

Seventeenth Day of January, 1989

Attest:

DONALD J. QUIGG

Attesting Officer

Commissioner of Patents and Trademarks